Dec. 16, 1924.   1,519,250
F. GELSTHARP
PROCESS FOR GRADING ABRASIVES
Filed June 23, 1921
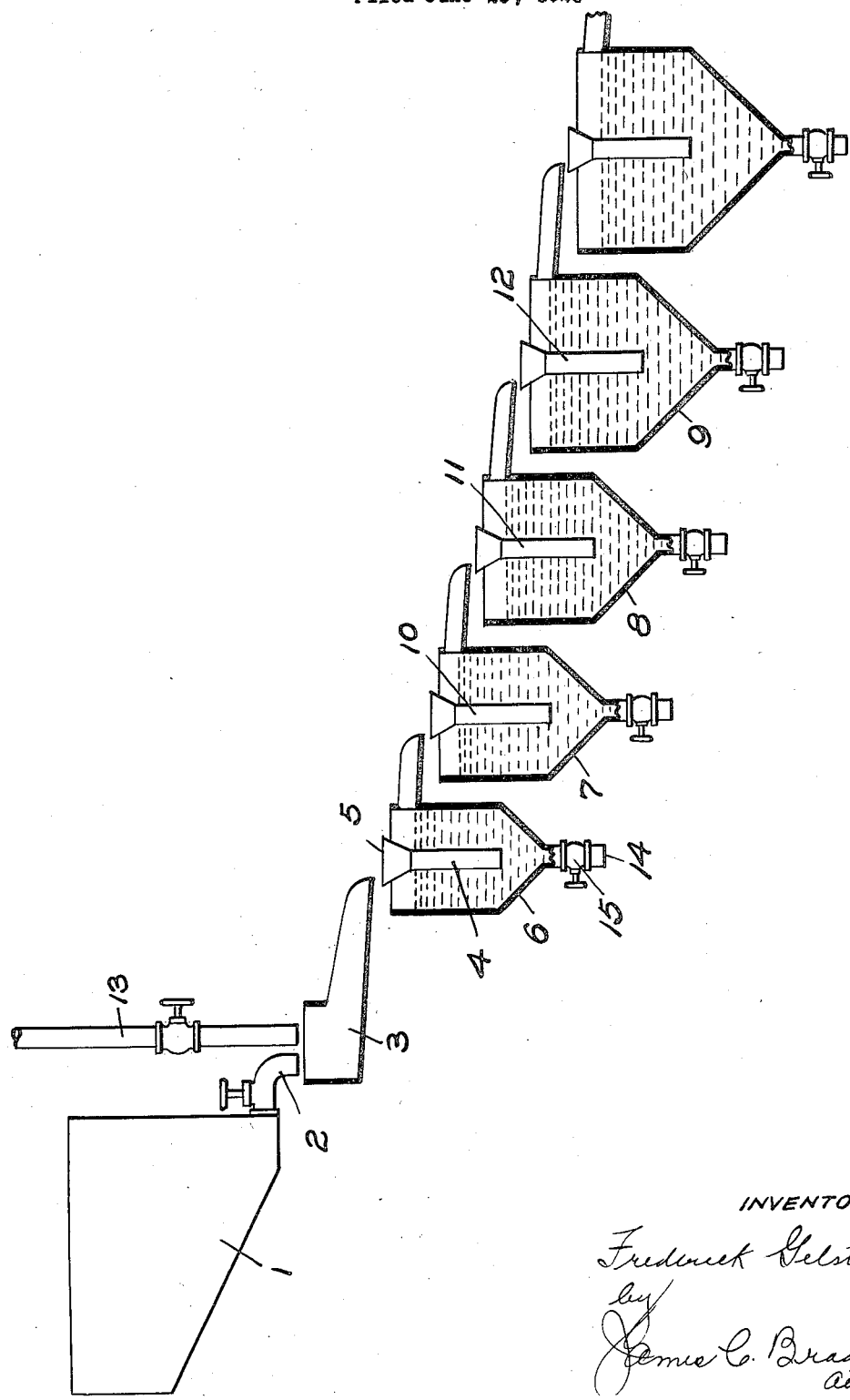
INVENTOR
Frederick Gelstharp
by
James C. Bradley
Atty.

Patented Dec. 16, 1924.

1,519,250

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

PROCESS FOR GRADING ABRASIVES.

Application filed June 23, 1921. Serial No. 479,855.

*To all whom it may concern:*

Be it known that I, FREDERICK GELSTHARP, a citizen of Great Britain, and a resident of Tarentum, in the county of Allegheny and State of Pennsylvania, have made a new and useful invention in Improvements in Processes for Grading Abrasives, of which the following is a specification.

This invention relates to the grading of abrasives particularly for use in giving plate glass what is known as its "smooth" after the ordinary coarse grinding operation with sand of varying degrees of fineness. It will be understood, however, that the abrasive secured by the improved process may be used in other industrial operations aside from the grinding or smoothing of glass.

For producing the smoothing action on plate glass preliminary to polishing, it has been heretofore the practice to employ emery which is a product produced in nature and ground to varying degrees of fineness. The emery is separated into several grades by a water grading operation and these are used successively from the coarsest to the finest, thus reducing the glass surface to a relatively high degree of smoothness. The degree of smoothness has been limited, however, by inability to secure the very finest grades of emery in the mass which is graded. There is a tendency of the finest particles to flocculate or adhere together or to larger particles, which, of course, prevents their separation from the coarser grades.

The purpose of the present invention is to provide a process whereby the tendency of the finer grades to flocculate or adhere is prevented to the end that such particles may be collected in a separate grade or series of grades finer than those heretofore collected.

Further objects are to secure a more complete separation from the abrasive of mud or other non-abrasive material, and to secure a cleaner and more accurate separation of the coarser grades.

While the invention may be utilized to advantage in the grading of emery, which is the abrasive generally employed in securing a "smooth" upon plate glass, I have found that it may be used to advantage with other very fine abrasives designed for a similar use.

Briefly stated, the invention involves the use, during the grading operation, of a separating or deflocculating agent which has the effect of causing the fine particles to separate from each other and from the larger particles so that the grading action of the liquid may be effective to produce a separation which will bring into the same grade those particles which are of the same size, and so that the finer grades will not be carried down by the coarse. The best agent so far found is gum arabic, altho a number of other substances, such as glue and ammonia, have a similar effect when used in somewhat larger quantities, but are greatly inferior in accomplishing the result desired, and because of the objectionable odor. I have found the quantity of gum arabic may be varied within certain limits, depending upon conditions, but that the best results are secured when the gum arabic constitutes about one-half to two per cent by weight of the carborundum or alundum being graded. Too much of the agent causes the graded material to settle into a hard mass. The deflocculator is added to the mixture of water and abrasive previous to grading, preferably in the mixing chamber, so that it is effective throughout the grading in all the successive cans.

The apparatus for grading the abrasive as generally used comprises the mixing container and a series of ten or twelve cans of increasing cross sectional area, the arrangement being shown in the accompanying drawings in which;

The figure is a diagrammatic sectional view of a part only of the series of cans, the rest of the series being similarly constructed and arranged.

In starting the operation the emery and water are mixed in the tank 1, together with the gum arabic, which is to give the deflocculating or separating function heretofore explained. The liquid is then allowed to escape through the outlet 2, and from this outlet it flows through the trough 3 to the pipe 4 provided at its upper end with the funnel 5. The pipe 4 leads to a point adjacent the bottom of the first can 6, such can and the succeeding cans 7, 8, 9, etc. being filled to the level indicated, with clear water. The overflows from the various cans pass successively to the pipes 10, 11 and 12, which pipes are provided with the funnel upper ends similar to that of the pipe 4.

Coincident with the flow of the mixture of the abrasive and water from the tank 1, a supply of water is also provided through the pipe 13, and the flow from the tank 1 is continued until the mixture is completely withdrawn. As the flow from the outlet 2 decreases the flow of water from the pipe 13 is increased, so that at the end of the operation only clear water is flowing through the trough 3 into the pipe member 4, and this flow is continued until the grading in the cans is completed. The purpose in increasing the flow through the pipe 13 as the flow through the pipe 2 decreases is to maintain the downward flow through the pipe 4, and, in fact, through the entire system uniform, so that the grading action due to the upward flow of the water in the various cans is uniform. The supplying of the liquid through the pipe members 4, 10, 11, 12, etc., gives an upward flow through each of the cans, and as these cans are of increasing size, the velocity of upward flow in each succeeding can is less. As a result the first can retains the coarsest abrasive and each succeeding can a finer grade.

The grades retained in the first cans are too coarse for use in smoothing, and after the completion of the operation are removed and reground, but the grades collected in the final four or five cans are of the requisite degree of fineness for use and are removed and used in the grinding operation in the usual way. Each can is provided at its lower end with an outlet 14, provided with a valve 15, for withdrawing the contents after the grading operation is completed.

The use of gum arabic as heretofore referred to causes the particles of abrasive to separate from each other, so that the amount of the finer grades which are carried down by the coarser particles in the first cans of the series, is reduced to a minimum. As a result, the amount of the finer grades collected in the final cans is increased, but still more important, the grading can be carried to a finer degree,—that is, finer grades may be secured at the end of the operation due to the fact that the fine particles are separated instead of adherent to each other. By the use of these finer grades not obtainable without the use of the deflocculating agent, the smoothing operation with the abrasive can be carried much further than has heretofore been possible, and as a result, the final polishing operation with rouge can be accomplished more quickly, thus involving a saving of time and power. For instance, it has been found possible to reduce the time of polishing glass, smoothed by these finer grades of emery, about forty per cent. The polishing operation is expensive by reason of the great amount of power required, and this decrease in the time of polishing and the consequent power consumption involves great economy, even where a few minutes' more time is consumed in applying the finer grades of abrasive in the smoothing operation, as heretofore described. The application of these finer grades of abrasive as secured by the process herein set forth, may consume from five to ten minutes longer in this smoothing operation, but the power consumption per minute is much less than in the polishing operation, so that the total saving in power incident to the separation of the finer grades, which it has been heretofore impossible to utilize, involves in the aggregate not only a saving of time in the total operation but a relatively greater saving in power required.

After the operation as heretofore described with the use of the deflocculating agent has been carried as far as it is practical to carry it, there still remains in the overflow a certain amount of exceedingly fine abrasive mixed with mud, which mixture has heretofore been conducted to the sewer and thrown away. I have found that this material in suspension may be saved and collected by adding thereto what may be termed a flocculating agent,—that is an agent which performs a function the reverse of the deflocculating function and causes the particles of abrasive and mud to adhere to each other, thus forming large particles which can be settled and utilized. A number of substances can be used to accomplish this function, among which may be mentioned common salt and alum. These substances when added to the last can of the series cause a large proportion of the material to settle, after which it may be removed and used as the final smoothing abrasive. This material contains impurities in the form of mud which has no abrasive action, but the percentage of abrasive is sufficient to permit the use of the mixture as an abrasive, and the use of this abrasive gives a very fine finish to the glass so that the time of polishing may be still further cut down.

The invention has been described in connection with the form of separator or grader illustrated, which is the one more commonly used in the plate glass art, but the invention is not limited to a grader or separator of this character, and is applicable to any separator in which the separation of the material into grades is accomplished by a flow of liquid upward through a body of liquid containing the particles of abrasive of varying size in suspension. One of the other systems to which this feature of securing additional separation by the use of a deflocculator has been applied involves the use of a conical grader of relatively large size surrounded by or placed adjacent to a series of small cones from which the contents of the large cone is directed from the different levels thereof, such system being shown and described in the Hitchcock Patent No. 1,100,302 of June 16, 1914. An upward flow of liquid in the large cone causes the different grades to collect in different strata, owing to the varying upward velocity through the cone, the larger particles accumulating near the bottom of the cone and the size of the particles decreasing from the bottom of the cone up. The various finer grades suitable for smoothing work are withdrawn into the smaller cones and subjected to a further grading action to remove any particles which were not properly graded in the initial operation. The material in the bottom of the large cone which is too coarse for use as a smoothing abrasive is withdrawn and reground as in the other type of apparatus. The use of the deflocculator here accomplishes the same function as in connection with the other type of apparatus. The invention is obviously not limited to any particular type of apparatus, the principle being generally applicable where there is a water flow operation.

What I claim is:

1. The process of grading inorganic abrasives consisting in subjecting a mass of abrasive to a liquid flow in the presence of a deflocculating agent and collecting separate size grades of the abrasive as suspended thereby, the grains of the different grades being of substantially the same composition.

2. The process of grading inorganic abrasives consisting in subjecting a mass of abrasive to an upward flow of liquid in the presence of a deflocculating agent and collecting separate size grades of the abrasive as suspended thereby, the grains of the different grades being of substantially the same composition.

3. The process of grading inorganic abrasives consisting in subjecting a mass of abrasive to a liquid flow in the presence of gum arabic as a deflocculating agent and collecting separate size grades of the abrasive as suspended thereby, the grains of the different grades being of substantially the same composition.

In testimony whereof, I have hereunto subscribed my name this 16th day of June, 1921.

FREDERICK GELSTHARP.

Witness:
G. C. DODSON.